(12) United States Patent
Huntsman

(10) Patent No.: US 9,918,461 B1
(45) Date of Patent: Mar. 20, 2018

(54) FISHING POLE HOLDER

(71) Applicant: Thomas J. Huntsman, North Platte, NE (US)

(72) Inventor: Thomas J. Huntsman, North Platte, NE (US)

( * ) Notice: Subject to any disclaimer, the term of this patent is extended or adjusted under 35 U.S.C. 154(b) by 350 days.

(21) Appl. No.: 14/964,009

(22) Filed: Dec. 9, 2015

Related U.S. Application Data

(60) Provisional application No. 62/089,382, filed on Dec. 9, 2014.

(51) Int. Cl.
*A01K 97/10* (2006.01)
*A01K 97/00* (2006.01)
*F16M 11/18* (2006.01)
*A01K 97/11* (2006.01)

(52) U.S. Cl.
CPC .............. *A01K 97/10* (2013.01); *A01K 97/00* (2013.01); *A01K 97/11* (2013.01); *F16M 11/18* (2013.01)

(58) Field of Classification Search
CPC ................................ A01K 97/10; A01K 97/11
USPC .................. 43/21.2, 54.1, 15; 248/534, 540; 211/70.8
See application file for complete search history.

(56) References Cited

U.S. PATENT DOCUMENTS

| 2,199,034 | A |   | 4/1940  | Witczak |
| 2,555,073 | A |   | 5/1951  | Zdankoski |
| 2,626,770 | A |   | 1/1953  | Norman |
| 2,707,089 | A |   | 4/1955  | Jackson |
| 2,756,954 | A | * | 7/1956  | Whitlow ................ A01K 97/10 248/133 |
| 3,532,309 | A |   | 10/1970 | Reddick |
| 3,659,369 | A |   | 5/1972  | Hermanson |
| 4,004,365 | A |   | 1/1977  | Manchester |
| 4,156,982 | A |   | 6/1979  | Phillips, Jr. |
| 4,159,816 | A | * | 7/1979  | Miyamae ................ A01K 97/10 248/228.6 |
| 5,561,937 | A |   | 10/1996 | Johnson |
| 6,088,946 | A | * | 7/2000  | Simmons ................ A01K 97/11 248/535 |
| 6,446,379 | B1 |  | 9/2002  | James |
| 6,974,113 | B1 | * | 12/2005 | Clark ..................... A01K 97/10 248/521 |
| 8,567,108 | B1 | * | 10/2013 | Babbs .................... A01K 97/11 43/15 |
| 2005/0229470 | A1 | * | 10/2005 | King ...................... A01K 97/10 43/21.2 |
| 2014/0137460 | A1 | * | 5/2014  | Weber .................... A01K 97/12 43/21.2 |
| 2015/0342168 | A1 | * | 12/2015 | Helms .................... A01K 97/01 43/54.1 |

FOREIGN PATENT DOCUMENTS

WO          2008094913 A2      8/2008

* cited by examiner

*Primary Examiner* — Marc Burgess
(74) *Attorney, Agent, or Firm* — Robert C. Montgomery; Montgomery Patent + Design LP.

(57) ABSTRACT

A support stand for a fishing pole is selectively attachable to a portion of a fixed structure and configured to hold a fishing pole awaiting a strike. The stand is adjustable for use in various environments by providing clamping and strapping means for attachment and additionally includes a lighting device.

18 Claims, 7 Drawing Sheets

FISHING POLE HOLDER

RELATED APPLICATIONS

The present invention is a continuation of, was first described in, and claims the benefit of U.S. Provisional Application No. 62/089,382, filed Dec. 9, 2014, the entire disclosures of which are incorporated herein by reference.

FIELD OF THE INVENTION

The present invention relates generally to an adjustable support stand for a fishing pole holder that is selectively attachable to a portion of a support structure.

BACKGROUND OF THE INVENTION

The technology used by anglers to catch fish has become increasingly complex in nature. Fishermen no longer rely solely upon the traditional hook and worm approach to attract their game. Instead, a broad range of products have hit the market, designed to aid the fisherman to catch more fish quickly. Regardless of the technology employed, the fisherman still has to hold the rod.

While many will argue this is the most enjoyable part of fishing, it still presents a difficulty during some portions of the fishing experience. One (1) of these times is while trying to secure or remove a hook, lure, float, sinker, or the like on the end of the rod. These operations are tricky enough without the additional requirement of using one (1) hand to hold the rod. Others such as the elderly or disabled find it physically impossible to hold a rod, even for a short period of time. Finally, while children typically love the whole adventure of fishing, the time spent holding a rod usually exceeds their attention span.

Accordingly, there is a need for a means by which fishing poles can be supported in an unattended manner which addresses the disadvantages as described above. The use of the holder allows fishermen the ability to fish while not being required to hold the rod in a manner which is quick, easy, and effective.

SUMMARY OF THE INVENTION

The inventor has recognized the aforementioned lack in the art and observed that there is a need for a fishing pole holder that is selectively attachable to a portion of a support structure.

It is therefore an object of the invention to provide a pole holding device comprising an expandable base. The expandable base has a first plate and a second plate. The first and second plates are planar and conjoining. The device also has an upper support block which is secured to an upper face of the first plate and consists of a first block body having a planar bottom, sidewalls, and defining a first block cavity. The upper support block also has a first block cover which is attached to the first block body using a first block hinge.

The device also has an adjustable "C"-clamp fastened to a bottom face of the first plate subjacent from the upper support block; a lower support block, comprising a second block body affixed to a bottom face of the "C"-clamp opposite the upper support block; and, a rod support assembly centrally attached to an upper face of the second plate. The rod support assembly consists of a rear block body having a planar bottom, sidewalls, and defining a rear block cavity. The rod support assembly also consists of a rear block cover which is attached to the rear block body with a rear block hinge and a rod tube which is adjustably attached to an upper face of the rear block cover.

The rod support assembly may also consist of a cover groove, formed within the rear block cover and having a longitudinal axis oriented perpendicularly to a longitudinal axis of the rear block cover; a cover aperture disposed along a midline axis of a sidewall of the rear block cover, having an orientation perpendicular to the cover groove; a tube bar, secured longwise to the rod tube; a plurality of tube bar apertures located along a length of the tube bar; a pair of cover springs disposed within the rear block cavity to bias the rear block cover in an open position; a cover latch secured on the rear block cover and configured to pivot around a support stem; and, a latch post secured on a face of the rear block body. The tube bar is capable of being secured to one of the tube bar apertures with a securing fastener. The cover latch engages with the latch post.

The device in an alternate embodiment also has a storage box affixed to the upper face of the first plate proximal to the upper support block. The storage box has a planar bottom, sidewalls and defining a box cavity. There is also a lid which is attached to the box base. The storage box further comprises at least one box divider and a box latch secured to the box lid.

The rod tube is configured to support a fishing rod. Support fasteners secure the second block body, the "C"-clamp, the first plate, and the first block body together. The upper support block, the "C"-clamp, and the lower support block are each independently configured to be removably attach the device to a support structure.

The base may also consist of a pair of dowels disposed within the second plate; a pair of cavities formed into the first plate configured to be aligned with the pair of dowels; and, a base spring housed within each of the pair of cavities to bias the second plate away from the first plate when the first plate and the second plate are conjoined. The first plate and the second plate have coextensive widths with the first plate having a greater length than does the second plate. A light source may also be removably attached to the first block cover. The light source may be a light snap post located within an upper surface of the first block cover capable of being attached to the light source.

The device may also have an adjustable upper strap affixed to the first block body at each side and an adjustable lower strap affixed to the lower block body at each side. The securing fastener may consist of a threaded shaft with a knob at its distal end and a threaded retainer at the other end. The device may also have a first fastener located on a bottom surface of the first plate and a second fastener located on a bottom surface of the second plate. The first and second fastener mate when the first and second plate abut each other.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
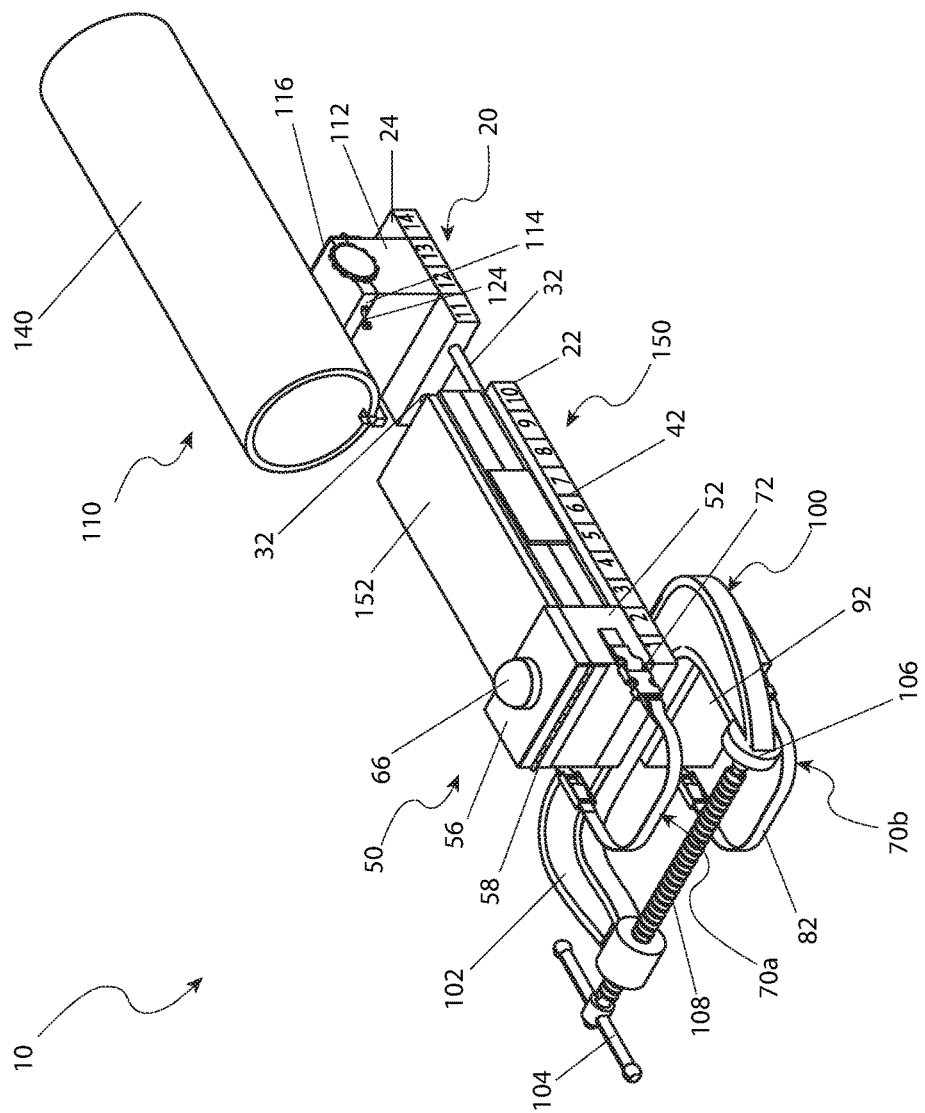
FIG. 1 is an isometric view of a fishing pole holder 10 in accordance with the preferred embodiment of the present invention.
Figure 2:
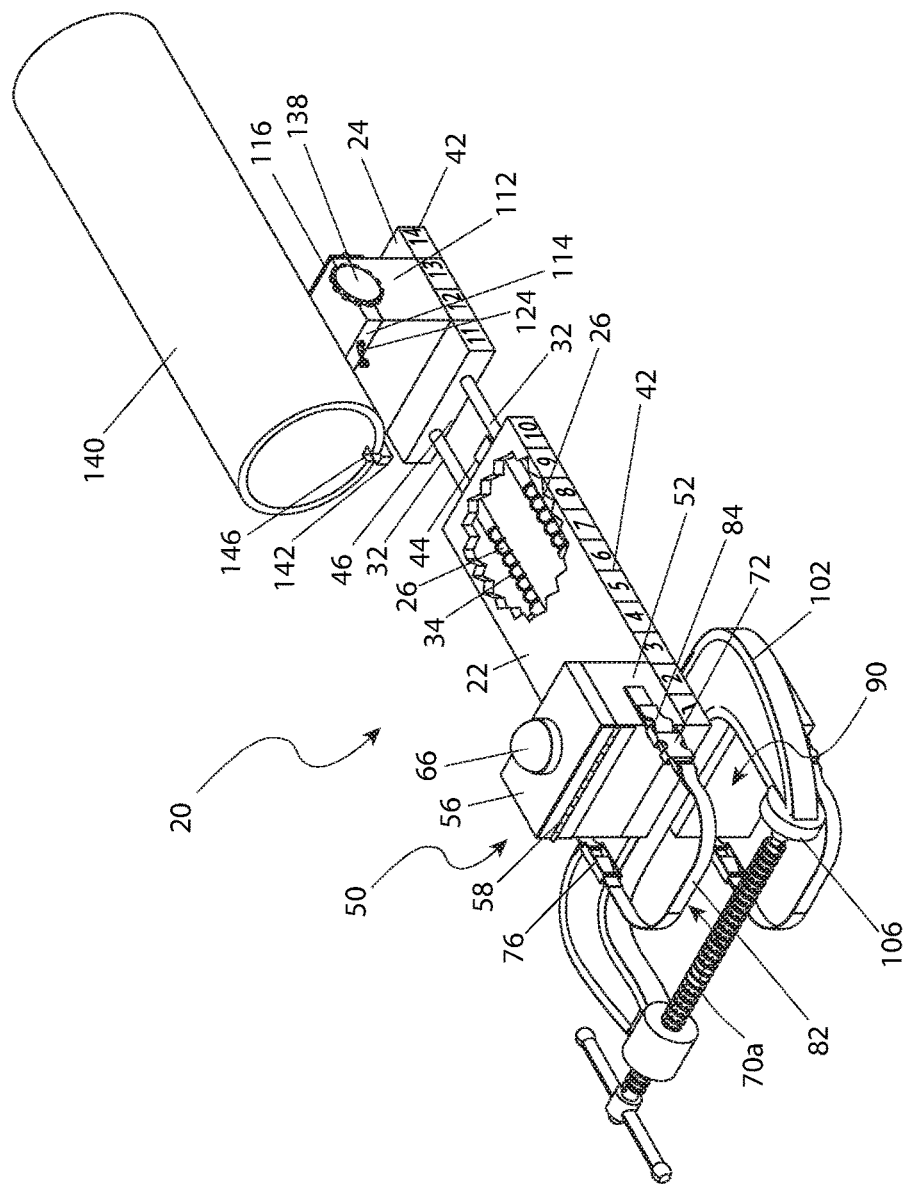
FIG. 2 is a breakaway view of a first plate dowel cavity 26 of the fishing pole holder 10 in accordance with the preferred embodiment of the present invention.

DESCRIPTIVE KEY 10 fishing pole holder
20 base
22 first plate
24 second plate
26 first plate dowel cavity
32 dowel
34 base spring
42 indicia
44 first fastener
46 second fastener
50 upper support block
52 first block body
54 first block cavity
56 first block cover
58 first block hinge
62 light snap post
64 side snap post
66 light source
68 illumination
70a upper support strap
70b lower support strap
72 strap buckle
74 strap buckle snap
76 strap tensioner
82 strap belt
84 first belt piece
86 second belt piece
90 lower support block
92 second block body
94 support fastener
96 wing nut
98 hex nut
100 "C"-clamp
102 clamp body
104 handle
106 anvil
108 screw
110 rod support assembly
112 rear block body
114 rear block cover
116 rear block hinge
118 rear block cavity
122 rear block fastener
124 cover latch
126 latch post
128 cover groove
132 cover aperture
134 threaded shaft
136 threaded retainer
138 knob
140 rod tube
142 tube bar
144 adjustment aperture
146 reel notch
148 cover spring
150 storage box
151 box base
152 box lid
153 box divider
154 box latch
155 box cavity
156 box fastener
200 fishing rod

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fishing pole holder (herein referred to as the "apparatus") 10, which provides a means to secure a fishing rod 200 in a ready-for-use position. The apparatus 10 includes a detachable light source 66 and a storage box 180 having a lid capable of being latched. In the ensuing narrative, the term "front" shall indicate that portion of the apparatus 10 proximal to the point of attachment to a support structure of any kind.

Referring now to FIG. 1, an isometric view of the apparatus 10 according to the preferred embodiment of the present invention, is disclosed. The apparatus 10 includes an expandable base 20 equipped with an upper support block 50, a lower support block 90, an adjustable "C"-clamp 100, a rod support assembly 110, and a storage box 150. The base 20 is composed of a planar, rectangular first plate 22 and a second plate 24, capable of being conjoined. The first plate 22 and the second plate 24 have coextensive widths, whereas the length of the first plate 22 is larger than the length of the second plate 24. The first plate 22 and the second plate 24 are composed of wood, including any of the varieties of hard and soft woods typically utilized in cabinetmaking, and coated with an appropriate substance, such as paint, to inhibit deterioration. It is understood that other materials may be utilized without limiting the scope of the apparatus 10. A pair of cylindrical dowels 32 is disposed within the second plate 24 along a medial horizontal plane. The dowels 32 are composed of wood, or metal, and are configured to be aligned parallel and project into the first plate dowel cavities 26 formed into the first plate 22. The first plate dowel cavities 26 are disposed along a similar medial horizontal plane in the first plate 22 and have a sufficient depth to accept the projecting dowels 32 plus additional length to accommodate a base spring 34 as depicted in the breakaway view in FIG. 2. The base spring 34 is a compression-type spring configured to bias the base 20 toward an extended configuration by exerting a spring force between the end of the inserted dowel 32 and the blind end of the first plate dowel cavity 26.

Figure 4:
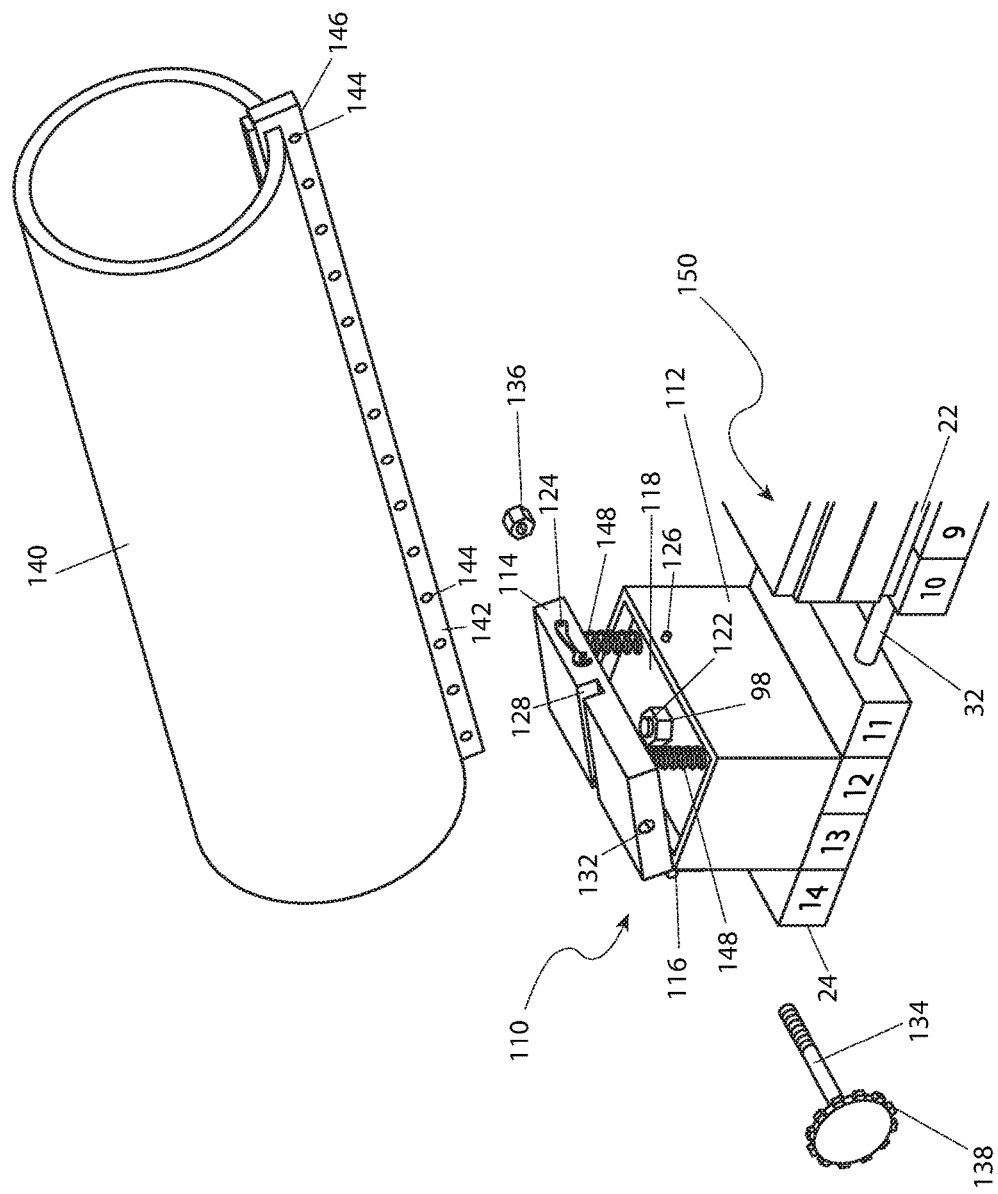
FIG. 4 is an exploded view of a rod support assembly 110 of the fishing pole holder 10 in accordance with the preferred embodiment of the present invention.
Figure 6A:
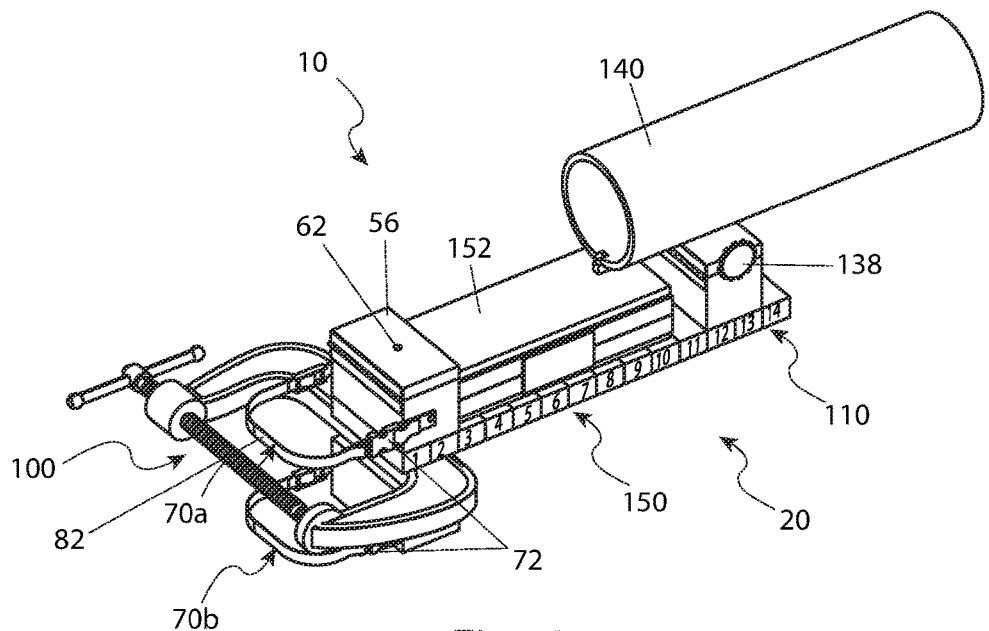
FIG. 6a is an isometric view of the fishing pole holder 10 in a collapsed arrangement in accordance with the preferred embodiment of the present invention.
Figure 6B:
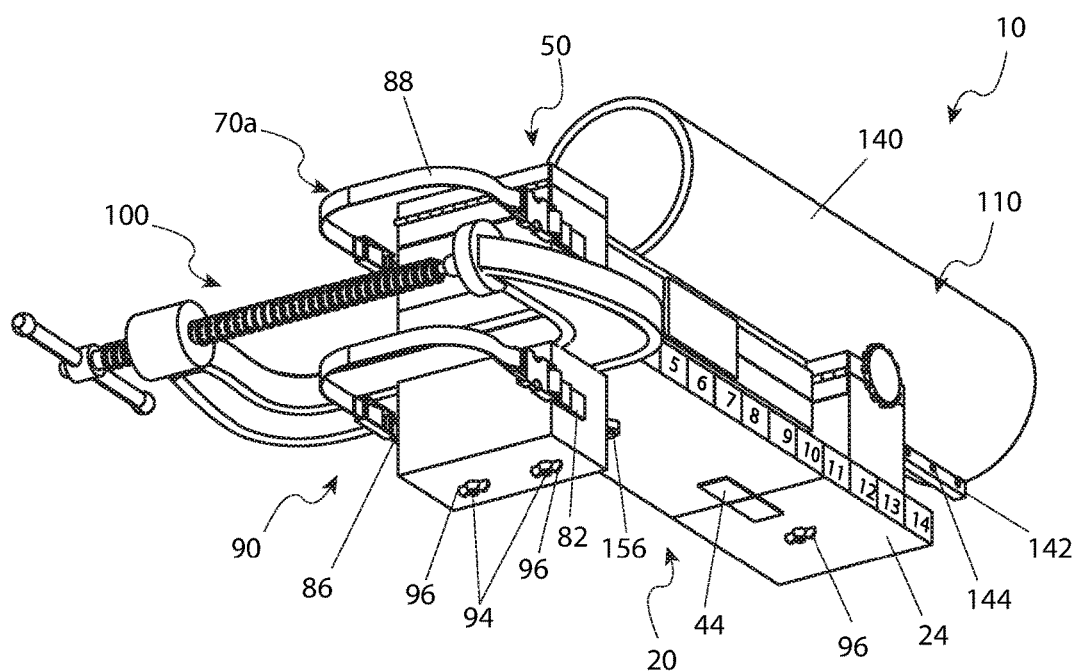
FIG. 6b is an isometric view of the underside of the fishing pole holder 10 in a collapsed configuration in accordance with the preferred embodiment of the present invention; and, FIG. 7 is an isolated view of a storage box 150 of the fishing pole holder 10 in accordance with the preferred embodiment of the present invention.
Figure 7:
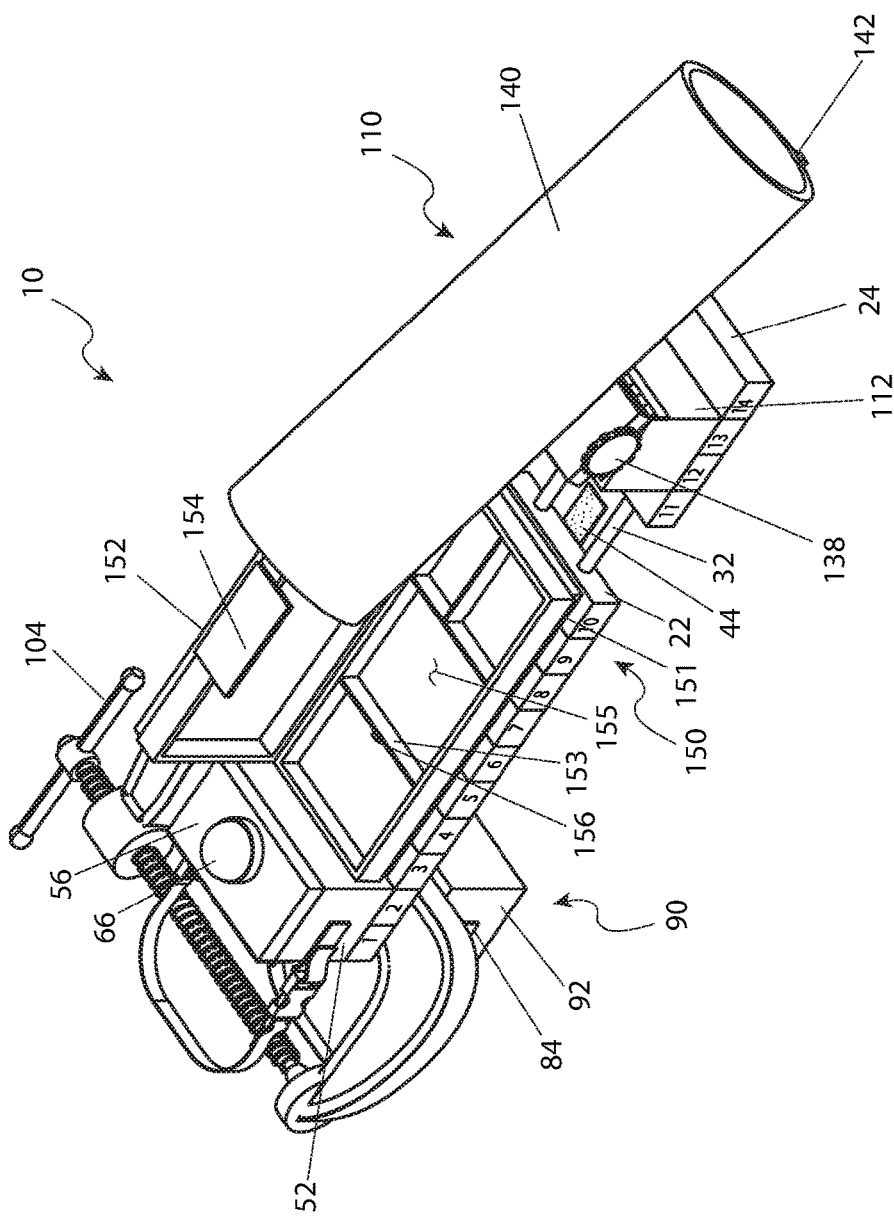

Disposed on a lower face of the first plate 22, in nearest proximity to the second plate 24, as more clearly illustrated in FIG. 4, is a first fastener 44, configured to be an extending hooks portion of a hook-and-loop fastener such as VELCRO®. Disposed on a lower face of the second plate 24, in proximity to the first plate 22 is a second fastener 46, configured to be a complimentary loops portion of a hook-and-loop fastener. When not in use, the first plate 22 is placed adjacent to the second plate 24 to collapse the base 20, thereby compressing the base springs 34, and the first fastener 44 is engaged with the second fastener 46 to secure the base as seen in FIG. 6b. It is envisioned that certain indicia 42, such as, but not limited to, lines and numerals arranged in a uniform pattern, may be disposed along any edge of the base 20 so as to present a comparative pattern against which other items, such as fish, may be gauged.

An upper support block 50 is attached to an upper face of the base 20 at a front edge by means of at least two (2) threaded support fasteners 94 projecting through the base 20. The upper support block 50 includes a first block body 52, configured to have a first block cavity 54 disposed therein, and a first block cover 56. The first block body 52 and the first block cover 56 are composed of wood, although other materials, such as rigid thermoplastics, may be utilized. The first block body 52 is in the shape of a rectangular prism having the first block cavity 54 formed with a planar bottom and minimal vertical sidewalls. The first block cavity 54 is cut to a depth of approximately one half (½) of the overall height of the first block body 52. The rectangular first block cover 56 is attached to the first block body 52 by means of a piano-type first block hinge 58 secured with a plurality of appropriate fasteners. The upper support block 50 is coated with an appropriate substance, such as paint, to inhibit deterioration. The support fasteners 94 are configured to be pieces of all-thread inserted through upper support apertures (not shown) in the first block body 52. The support fasteners 94 are retained within the first block cavity 54 by means of hex nuts 98 threaded onto the support fasteners 94.

A light source 66 is removably attached to an upper surface of the first block cover 56. The light source 66 can be any self-contained, battery-operated fixture having any type of bulb capable of emitting a sufficient amount of illumination 68 to assist a user accomplish various tasks in situations wherein the ambient light level is low, with a selectively operated switch, such as an ENERGIZER® model EVEHDL33A2E, or the like. A light snap post 62, having a threaded shank, is attached centrally to the upper face of the first block cover 56 as presented in FIG. 6a. A snap post receiver (not shown) is attached to a lower face of the light source 66 to enable the subsequent attachment of the light source 66 to the first block cover 56. In use, the first block cover 56 may be pivoted about the pin of the first block hinge 58 in order to somewhat direct the illumination 68 of the light source 66.

Figure 3:
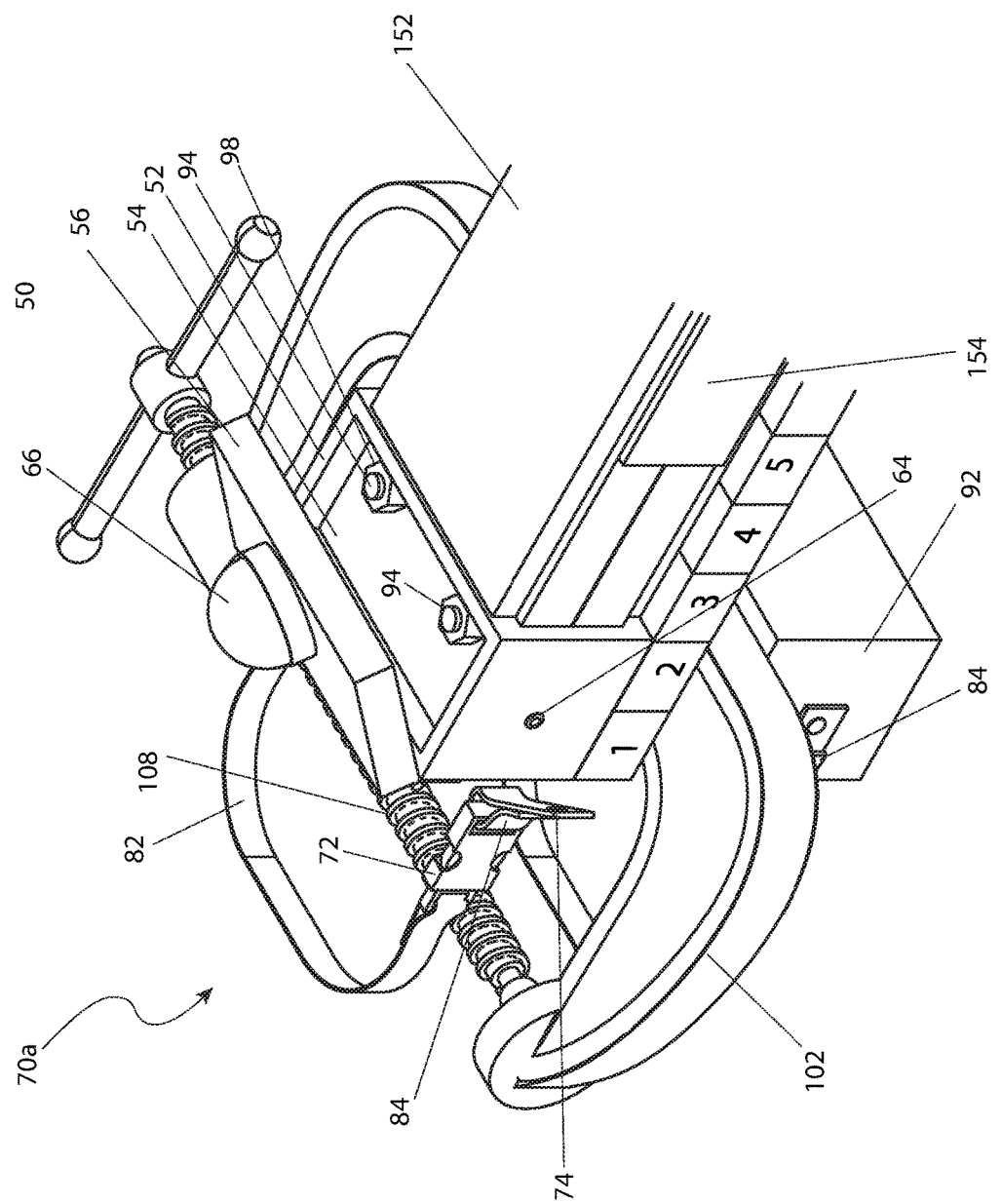
FIG. 3 is an isolated view of an upper support block 50 of the fishing pole holder 10 depicted with a first block cover 56 in an up position in accordance with the preferred embodiment of the present invention.

An upper support strap 70a is attached at each side of the first block 32. The upper support strap 70a is configured to be a strap belt 82 with a strap buckle 72 and a strap tensioner 76. The strap belt 82 is comprised of polyester webbing. A first belt piece 84 is permanently attached to the strap buckle 72 by means of being wrapped around some receiving bar and stitched back upon itself with polyester thread. The strap buckle 72 is a commercially available, two-piece buckle, such as a plastic "side release buckle" obtained through strapworks.com, having a retaining device into which a spring tang can be inserted and restrained. A strap snap 74, configured to be snap post receiver, is attached near an end of the first belt piece 84 opposite from the strap buckle 72. A side snap post 64, configured similarly to the previously discussed light snap post 62, is threaded into a side face of the first block body 52, as shown in FIG. 3, as a selective attachment point for the strap snap 74 and the attached strap buckle 72. A second belt piece 86 is permanently attached to the strap tensioner 76 by means of being wrapped around a receiving bar and stitched back upon itself. The strap tensioner 76 is a standard, commercially available device, such as a plastic "strap adjuster" (product code PSA) through strapworks.com, capable of maintaining a selected position along any belt fitted into the strap tensioner 76 and intertwined therein. Another strap snap 74, similar to the depiction of FIG. 3, is attached near an end of the second belt piece 86 opposite from the belt tensioner 76. Another side snap post 64 is threaded into a side face of the first block body 52, opposite from the attachment point of the strap buckle 72, as a selective attachment point for the strap snap 74 and the attached strap tensioner 76. The strap belt 8, somewhat longer than both the first belt piece 84 and the second belt piece 86, is attached to a portion of the strap buckle 72 opposite from the first belt piece 84 at a first end. The second end of the strap belt 82 is operationally intertwined into the strap tensioner 76 so as to bind against itself to maintain a selective position. In use, the strap snap 74 on the first belt piece 84 is connected to a side snap post 64 on one (1) side of the first block body 52 while the strap snap 74 on the second belt piece 86 is connected to a side snap post 64 on the opposite side of the first block body 52. The strap belt 82, being permanently attached to the strap buckle 72, is laced into the strap tensioner 76, the strap buckle 72 is engaged with the upper support strap 70a fitted around a support structure, and any slack existing in the upper support strap 70a is drawn out through the strap tensioner 76 to secure the position of the apparatus 10 to a support structure, as portrayed in FIG. 5.

A "C"-clamp 100 is attached, via the support fasteners 94, subjacent to the first plate 22. The "C"-clamp 100 is a commercially available clamping device, such as an eight inch (8 in.) C-clamp, having a clamp body 102, upon which an anvil 106 is disposed, and an opposing screw 108 which can be rotated by means of a handle 104 to close the space between the end of the screw 108 and the anvil 106 to clamp upon certain support structures to operationally hold the "C"-clamp 100, and thereby the apparatus 10, to that support structure in a provisional manner. Two (2) apertures (not shown) are disposed in the clamp body 102 to accommodate the insertion of the support fasteners 94 in order to attach the "C"-clamp 100 to the first plate 22. The support fasteners 94 are configured to be secured in the apparatus 10 by means of wing nuts 96 threaded onto the support fasteners 102. This utilization of wing nuts 96 in the fastening means provides a method to assemble and disassemble the apparatus 10 without the use of hand tools. Therefore, the "C"-clamp 100 may easily be attached to the first plate 22 having the handle 104 oriented toward either side, at the discretion of the user, in the event that some obstruction limits the installation of the apparatus upon any support structure.

A lower support block 90 is attached subjacent to the "C"-clamp 100. The lower support block 90 comprises a second block body 92 in the shape of a rectangular prism composed of the same material as the first block body 52 with a coating, such as paint, to inhibit deterioration. Disposed in the second block body 92 are lower support apertures (not shown) to accommodate in insertion of the support fasteners 102 as a means of attachment of the second block body 92 to the "C"-clamp 100, the first plate 22, and the first block body 52. A side snap post 64 is inserted into each side of the second block body 92 in order to attach a lower support strap 70*b* to the lower support block 90. The lower support strap 70*b* is configured identically to the upper support strap 70*a*, as previously disclosed, having the function of serving as a dual attachment means for the apparatus 10 in concert with the upper support strap 70*a*. It is understood that a user may choose to assemble the apparatus 10 in an alternate manner to the method disclosed herein, or elect to forego one (1) or more attachment means, and that variation in method should not be construed as any limitation of the scope of the present apparatus 10.

Disposed upon the first plate 22, in proximity to the upper support block 50, is a storage box 150, having a box base 151 and a box lid 152, defining a box cavity 155. The storage box 150 is configured to be a commercially available thermoplastic container, such as a TUPPERWARE® container model 4195A, having the box lid 152 secured with a lid latch 154. The storage box 150 is attached to the first plate 22 by means of a box fastener 156 inserted within the box cavity 155 through the box base 151, as detailed in FIG. 7, and the first plate 22, and secured on the lower side with a wing nut 96. It is understood that the storage box 150 may be affixed to the first plate 22 with the utilization of other fastening means, such as staples or other threaded fasteners, without limiting the scope of the apparatus 10. The storage box 150 may be utilized for any purpose which suits a user, such as, but not limited to, storing fishing tackle, snack foods, or bait, without limiting the scope of the apparatus 10. Other embodiments of the storage box 150 can include at least one (1) box divider 153 for configuring the box cavity 155 into multiple compartments.

A rod support assembly 110 is attached centrally to the second plate 25. The rod support assembly 110 includes a rear block body 112 with a rear block cover 114 and a rod tube 140 having adjustment provisions included in a tube bar 142. The rear block body 112 and the rear block cover 114 are composed of wood and coated with an appropriate substance, such as paint, to inhibit deterioration. The rear block body 112, much the same as the first block body 52, is in the shape of a rectangular prism having a rear block cavity 118 formed with a planar bottom and minimal vertical sidewalls. The rear block cavity 118 is cut to a depth of approximately one quarter (¼) of the overall height of the rear block body 112. The rectangular rear block cover 114 is attached to the rear block body 112 by means of a rear block hinge 116 with a plurality of appropriate fasteners. The rear block body 112 is attached to the second plate 24 with a singular rear block fastener 122. This technique allows the rear block body 112, and indeed the entire rod support assembly 110, to pivot about this attachment point to permit a right-left adjustment for a user's fishing rod 200. The rear block fastener 122 is configured to be a piece of all-thread inserted through a rear block aperture (not shown) in the rear block body 112 and an aligned aperture (not shown) in the second plate 24. The rear block fastener 122 is retained within the rear block cavity 118 by means of a hex nut 98 threaded onto the rear block fastener 122 as drawn in FIG. 4. The rear block fastener 122 is retained on the lower face of the second plate 24 by means of a wing nut 96 as displayed in FIG. 6*b*. A pair of cover springs 148 is disposed within the rear block cavity 118. The cover springs 148 are compression-type springs configured to bias the rear block cover 114 in an open position as pictured in FIG. 4. The cover springs 148 allow for a certain permissible deflection of the fishing rod 200, supported within the rod tube 140 as drawn in FIG. 5, so as to give an appearance that the baited hook, or lure, is unsupported, thus deceiving the quarry into freely accepting it. A cover latch 124 is provided on the rear block cover 114 which is configured to pivot around a single support stem so as to engage with a latch post 126, as shown in FIG. 4, on a face of the rear block body 112 to compress the cover springs 148 for storage or disuse.

Referring now to FIG. 4, an exploded view of the rod support assembly 110 of the apparatus 10, according to the preferred embodiment of the present invention, is disclosed. A cover groove 128 is formed into the rear block cover 114 having a longitudinal axis oriented perpendicularly to the longitudinal axis of the rear block cover 114. This cover groove 128 provides an insertion and retention location for the tube bar 142 attached to the rod tube 140. A cover aperture 132 is disposed along a midline axis in the rear block cover 114 having an orientation perpendicular to the cover groove 128 so as to intersect with the cover groove 128. The rod tube 140 is a length of PVC pipe configured to serve as a holder for a user's fishing rod 200 (see FIG. 5). The tube bar 142 is attached, by an appropriate means, to some point on the periphery of the rod tube 140. The tube bar 142 is composed of a rigid thermoplastic, in keeping with the material utilized in the rod tube 140. It is understood that other materials, such as metals, may be utilized without limiting the scope of the apparatus 10. The tube bar 142 is provided with a plurality of adjustment apertures 144 for the provisional insertion of a threaded shaft 134. The threaded shaft 134 is a metal shaft provided with a standard thread in keeping with the acceptable diameter of the threaded shaft 134. The threaded shaft 134 is also provided with a fluted, or knurled, knob 138. The knob 138 is configured to have a larger diameter than a standard head commensurate with the diameter of the threaded shaft 134 in order to provide a user with additional torque to turn the threaded shaft 134. The threaded shaft 134 is inserted into the cover aperture 132 and through one (1) of the adjustment apertures 144, at the discretion of the user, in the tube bar 142 to secure the rod tube 140 to the rear block cover 114 and thereby to the apparatus 10. The rod tube 140 is additionally provided with a reel notch 146 in a distal end to provide the necessary clearance for some fishing gear. A user-supplied fishing rod 200 can then be inserted into the rod tube 140 as illustrated in FIG. 5.

Figure 5:
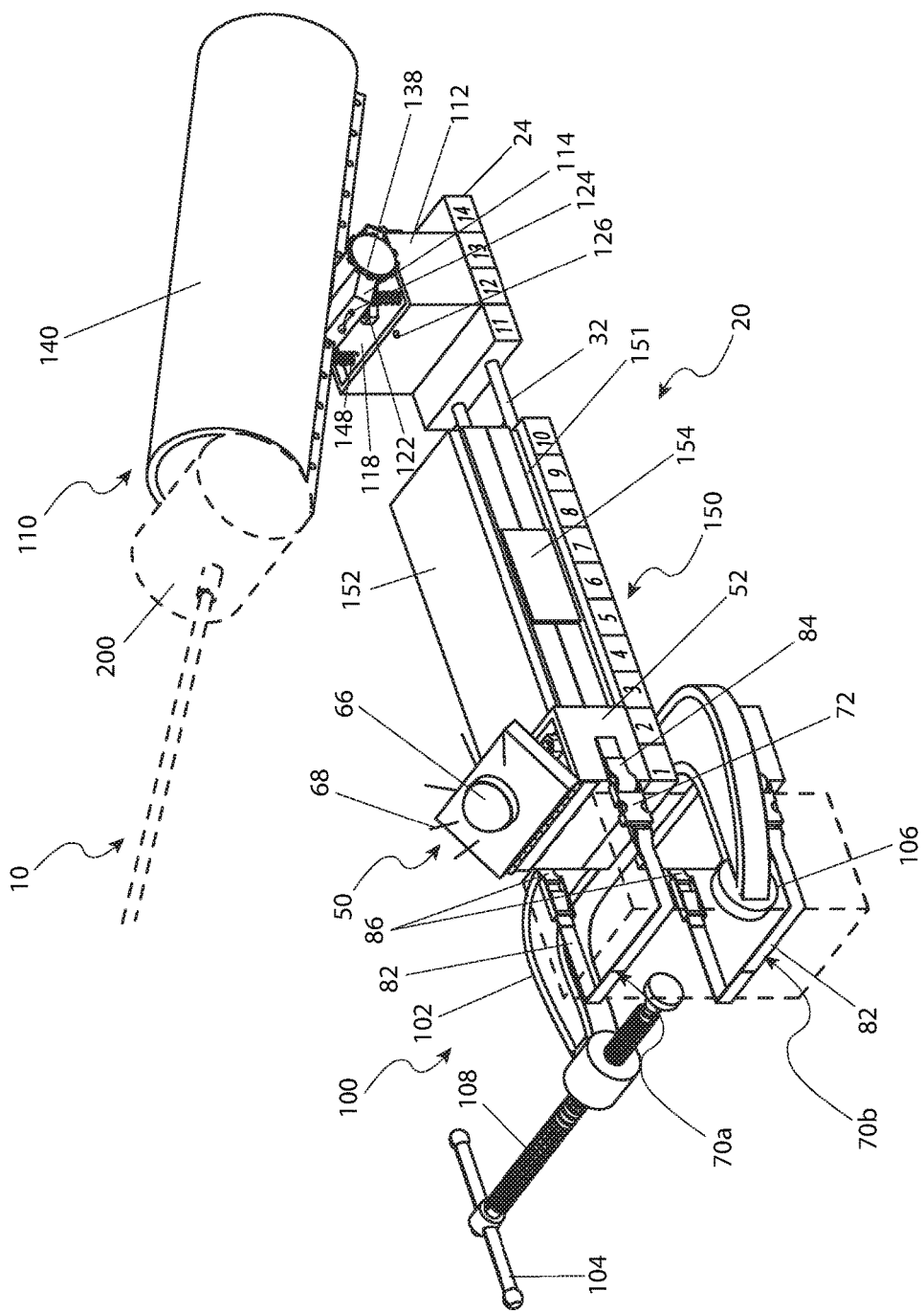
FIG. 5 is a view of the fishing pole holder 10 as seen in use in accordance with the preferred embodiment of the present invention.

Referring now to FIG. 5, a view of the apparatus 10 as seen in use, according to the preferred embodiment of the present invention, is disclosed. In use the apparatus is preferably attached to some support structure, such as a pier post, bridge column, or the like, with that structure configured to be positioned between the body of water and the apparatus 10. It is understood that other arrangements may be utilized without limiting the scope of the apparatus 10. As previously stated, the rear block body 112 is attached to the second plate 24 with a single rear block fastener 122. Hence, the wing nut 96 on the rear block fastener 122 may be loosened to allow the rod support assembly 110 to rotate to any position permitting the fishing rod 200 to be utilized on virtually any support structure. After positioning the rod support assembly 110 as needed, the wing nut 96 may be retightened to allow a user free use of the apparatus 10.

The preferred embodiment of the present invention can be utilized by an enabled individual in a simple and straightforward manner with little or no training. After initial purchase or acquisition of the apparatus 10, it would be installed as indicated in FIG. 5. The method of installing and utilizing the apparatus 10 may be achieved by performing the following steps: acquiring a model of the apparatus 10; installing batteries into the light source 66; disengaging the first fastener 44 from the second fastener 46 so as to allow the base 20 to expand; securing the apparatus 10 to a convenient support structure by utilizing the upper support strap 70a and the lower support strap 70b, in a manner congruent with the procedures presented previously in this narrative, or the "C"-clamp 100, or both; adjusting the rod tube 140 compliant with the size and style of the selected fishing rod 200; disengaging the cover latch 124 from the latch post 126 so as to adjust the inclination of the fishing rod 200; inserting the selected fishing rod 200 into the rod tube 140; preparing the fishing rod 200 by baiting the hook or installing a selected lure and enjoying fishing. The light source 66 can be energized to provide illumination 68 for necessary tasks performed in low light conditions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed:

1. A pole holding device, comprising:
  an expandable base, comprising:
    a first plate; and,
    a second plate;
    wherein said first and second plates are planar and conjoining;
    a pair of dowels disposed within said second plate;
    a pair of cavities formed into said first plate configured to be aligned with said pair of dowels; and,
    a base spring housed within each of said pair of cavities to bias said second plate away from said first plate when said first plate and said second plate are conjoined;
  an upper support block secured to an upper face of said first plate, comprising:
    a first block body, comprising a planar bottom, sidewalls, and defining a first block cavity therein; and,
    a first block cover, attached to said first block body with a first block hinge;
  an adjustable "C"-clamp fastened to a bottom face of said first plate subjacent from said upper support block;
  a lower support block, comprising a second block body affixed to a bottom face of said "C"-clamp opposite said upper support block; and,
  a rod support assembly centrally attached to an upper face of said second plate, comprising:
    a rear block body comprising a planar bottom, sidewalls, and defining a rear block cavity therein;
    a rear block cover attached to said rear block body with a rear block hinge;
    a rod tube adjustably attached to an upper face of said rear block cover;
    a cover groove, formed within said rear block cover and having a longitudinal axis oriented perpendicularly to a longitudinal axis of said rear block cover;
    a cover aperture disposed along a midline axis of a sidewall of said rear block cover, having an orientation perpendicular to said cover groove;
    a tube bar, secured longwise to said rod tube;
    a plurality of tube bar apertures located along a length of said tube bar;
    a pair of cover springs disposed within said rear block cavity to bias said rear block cover in an open position;
    a cover latch secured on said rear block cover and configured to pivot around a support stem;
    a latch post secured on a face of said rear block body;
    wherein said tube bar is capable of being secured to a desired one of said tube bar apertures with a securing fastener; and
    wherein said cover latch engages with said latch post;
  wherein said rod tube is configured to support a fishing rod;
  wherein support fasteners secure said second block body, said "C"-clamp, said first plate, and said first block body together; and,
  wherein said upper support block, said "C"-clamp, and said lower support block are each independently configured to removably attach said device to a support structure.

2. The device of claim 1, wherein said first plate and said second plate have coextensive widths and said first plate has a greater length than said second plate.

3. The device of claim 1, further comprising a light source removably attached to said first block cover.

4. The device of claim 3, further comprising a light snap post located within an upper surface of said first block cover capable of attachment to said light source.

5. The device of claim 1, further comprising an adjustable upper strap affixed to said first block body at each side.

6. The device of claim 1, further comprising an adjustable lower strap affixed to said lower block body at each side.

7. The device of claim 1, wherein said securing fastener is a threaded shaft with a knob at a distal end thereof and a threaded retainer.

8. The device of claim 1, further comprising:
  a first fastener located on a bottom surface of said first plate;
  a second fastener located on a bottom surface of said second plate;
  wherein said first and second fastener mate when said first and second plate abut each other.

9. A pole holding device, comprising:
  an expandable base, comprising:
    a first plate; and,
    a second plate;
    wherein said first and second plates are planar and conjoining;
    a pair of dowels disposed within said second plate;
    a pair of cavities formed into said first plate configured to be aligned with said pair of dowels; and,
    a base spring housed within each of said pair of cavities to bias said second plate away from said first plate when said first plate and said second plate are conjoined;
  an upper support block secured to an upper face of said first plate, comprising:

a first block body, comprising a planar bottom, sidewalls, and defining a first block cavity therein; and, a first block cover, attached to said first block body with a first block hinge;

an adjustable "C"-clamp fastened to a bottom face of said first plate subjacent from said upper support block;

a lower support block, comprising a second block body affixed to a bottom face of said "C"-clamp opposite said upper support block; and, a rod support assembly centrally attached to an upper face of said second plate, comprising:

a rear block body comprising a planar bottom, sidewalls, and defining a rear block cavity therein;

a rear block cover attached to said rear block body with a rear block hinge;

a rod tube adjustably attached to an upper face of said rear block cover;

a cover groove, formed within said rear block cover and having a longitudinal axis oriented perpendicularly to a longitudinal axis of said rear block cover;

a cover aperture disposed along a midline axis of a sidewall of said rear block cover, having an orientation perpendicular to said cover groove;

a tube bar, secured longwise to said rod tube;

a plurality of tube bar apertures located along a length of said tube bar;

a pair of cover springs disposed within said rear block cavity to bias said rear block cover in an open position;

a cover latch secured on said rear block cover and configured to pivot around a support stem;

a latch post secured on a face of said rear block body;

wherein said tube bar is capable of being secured to a desired one of said tube bar apertures with a securing fastener; and wherein said cover latch engages with said latch post;

a storage box affixed to said upper face of said first plate proximal to said upper support block further comprising:

a box base having a planar bottom, sidewalls and defining a box cavity therein; and, a box lid attachable to said box base;

wherein said rod tube is configured to support a fishing rod;

wherein support fasteners secure said second block body, said "C"-clamp, said first plate, and said first block body together; and, wherein said upper support block, said "C"-clamp and said lower support block are each independently configured to removably attach said device to a support structure.

10. The device of claim 9, wherein said first plate and said second plate have coextensive widths and said first plate has a greater length than said second plate.

11. The device of claim 9, further comprising a light source removably attached to said first block cover.

12. The device of claim 11, further comprising a light snap post located within an upper surface of said first block cover capable of attachment to said light source.

13. The device of claim 9, further comprising an adjustable upper strap affixed to said first block body at each side.

14. The device of claim 9, further comprising an adjustable lower strap affixed to said lower block body at each side.

15. The device of claim 9, wherein said securing fastener is a threaded shaft with a knob at a distal end thereof and a threaded retainer.

16. The device of claim 9, further comprising:

a first fastener located on a bottom surface of said first plate;

a second fastener located on a bottom surface of said second plate;

wherein said first and second fastener mate when said first and second plate abut each other.

17. The device of claim 9, wherein said storage box further comprises at least one box divider.

18. The device of claim 9, wherein said storage box further comprises a box latch secured to said box lid.

* * * * *